US012569106B2

(12) United States Patent
Zhong et al.

(10) Patent No.: US 12,569,106 B2
(45) Date of Patent: Mar. 10, 2026

(54) MOPPER

(71) Applicant: Nikia Investments Ltd., Apia (WS)

(72) Inventors: Yuanfei Zhong, Huizhou (CN); Michael Ho, BC (CA); Kai-Fan Hu, Taipei (TW)

(73) Assignee: Nikia Investments Ltd., Apia (WS)

( * ) Notice: Subject to any disclaimer, the term of this patent is extended or adjusted under 35 U.S.C. 154(b) by 337 days.

(21) Appl. No.: 18/237,568

(22) Filed: Aug. 24, 2023

(65) Prior Publication Data

US 2025/0064289 A1 Feb. 27, 2025

(51) Int. Cl.

| | |
|---|---|
| ***A47L 13/17*** | (2006.01) |
| ***B25G 1/04*** | (2006.01) |
| ***B25G 3/04*** | (2006.01) |
| ***B25G 3/38*** | (2006.01) |

(52) U.S. Cl.

CPC ................ *A47L 13/17* (2013.01); *B25G 1/04* (2013.01); *B25G 3/04* (2013.01); *B25G 3/38* (2013.01)

(58) Field of Classification Search

CPC ........ A47L 13/16; A47L 13/17; A47L 13/254; A47L 13/255; B25G 1/04; B25G 3/02; B25G 3/308; B25G 3/16; B25G 3/18; B25G 3/20; A47K 11/10

See application file for complete search history.

(56) References Cited

U.S. PATENT DOCUMENTS

2020/0129037 A1 * 4/2020 Meszaros ................. B25G 1/04

FOREIGN PATENT DOCUMENTS

KR 20110105154 A * 9/2011 ............. A47L 9/248

* cited by examiner

*Primary Examiner* — Shay Karls
(74) *Attorney, Agent, or Firm* — WPAT, PC

(57) ABSTRACT

A mopper and a cleaning handle are provided. The mopper includes a cleaning pad and a cleaning handle. The cleaning pad includes a pad body and a first connector disposed on the pad body. The cleaning handle includes a handle body, a second connector, and a slider. The second connector is connected to a first end of the handle body and configured to be fitted with the first connector in a concave-convex manner. The slider is movably sleeved outside the handle body, and the slider is configured to, in a situation that the first connector and the second connector are fitted together in the concave-convex manner, move towards the first end along a lengthwise direction of the handle body to drive the first connector to be separated from the second connector. The mopper is simple in structure, and is easy in use.

20 Claims, 9 Drawing Sheets

MOPPER

TECHNICAL FIELD

The disclosure relates to the technical field of cleaning devices, particularly relates to a mopper and a cleaning handle.

BACKGROUND

After the biggest epidemic in this century, the vital importance of maintaining a clean and sterile environment has become more prominent. Therefore, no direct contact with bacteria and dirt is required during cleaning, which can help reduce the risk of cross-infection and spread of germs, and ensure that the cleaning process is more hygienic and safe. As such, it is necessary to design a contactless cleaning device for improving health and safety.

SUMMARY

An objective of the disclosure is to provide a mopper and a cleaning handle, which is simple in structure and can facilitate a user to perform cleaning without contacting with bacteria and dirt.

In order to achieve the above objective, the disclosure exemplarily provides the following technical solutions.

Specifically, an embodiment of the disclosure provides a mopper. The mopper includes a cleaning pad and a cleaning handle. The cleaning pad includes a pad body and a first connector disposed on the pad body. The cleaning handle includes a handle body, a second connector, and a slider. The second connector is connected to a first end of the handle body and configured (i.e., structured and arranged) to be fitted with the first connector in a concave-convex manner. The slider is movably sleeved outside the handle body, and the slider is configured to, in a situation that the first connector and the second connector are fitted together in the concave-convex manner, move towards the first end of the handle body along a lengthwise direction of the handle body to drive the first connector to be separated from the second connector.

Another embodiment of the disclosure provides another mopper. The mopper includes one or more disposable pads and a clean handle. Each of the one or more cleaning pads includes a pad body and a first connector disposed on the pad body. The cleaning handle includes a handle body, a second connector, and a slider. The second connector is connected to a first end of the handle body and configured to be engaged with the first connector. The slider is movably sleeved on the handle body, and the slider is configured to, after the first connector and the second connector are rotatably and pivotably engaged with each other, move towards the first end of the handle body along a lengthwise direction of the handle body to drive the first connector to be separated from the second connector, where one of the one or more disposable pads includes a wet fabric with disinfectant or a dry fabric without disinfectant.

A yet another embodiment of the disclosure provides a cleaning handle. The cleaning handle includes a telescopic handle body, a connector, a slider, and a spring. The connector is connected to an end of the telescopic handle body and configured to be detachably connected with a cleaning pad. The slider is movably sleeved outside the end of the telescopic handle body. The spring is deformably sleeved on the end of the telescopic handle body and arranged in the slider. The slider is capable of moving towards the end of the telescopic handle body along a lengthwise direction of the telescopic handle body by manually pushing and is capable of moving back under an action of a restoration force of the spring.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF DRAWINGS

In order to provide a clearer explanation of embodiments of the disclosure, a brief introduction will be given to accompanying drawings required in the embodiments. It is apparent that the accompanying drawings in the following description are only some of the embodiments of the disclosure. For those skilled in the art, other accompanying drawings can be obtained based on these drawings without any creative effort.

DETAILED DESCRIPTION OF EMBODIMENTS

The following will provide a clear and complete description of the technical solution in the embodiments of the disclosure, in conjunction with the accompanying drawings. Apparently, the described embodiments are only some of the embodiments of the disclosure, not all of them. Based on the embodiments in the disclosure, all other embodiments obtained by those skilled in the art without creative labor fall within the scope of protection of the disclosure.

The purpose of the disclosure is to provide a mopper, which has a simple structure, and can facilitate a user to perform cleaning without contacting with bacteria and dirt.

Further, the mopper can be used in various scenarios, such as public places including airplanes, airports, railway stations, bus stops, shopping centers and parks, health care facilities including hospitals, clinics, nursing homes and medical laboratories, and a hotel industry.

In order to make the above purpose, features, and advantages of the disclosure more apparent and understandable, the following will provide further detailed explanations of the disclosure in conjunction with the accompanying drawings and specific embodiments.

Figure 1:
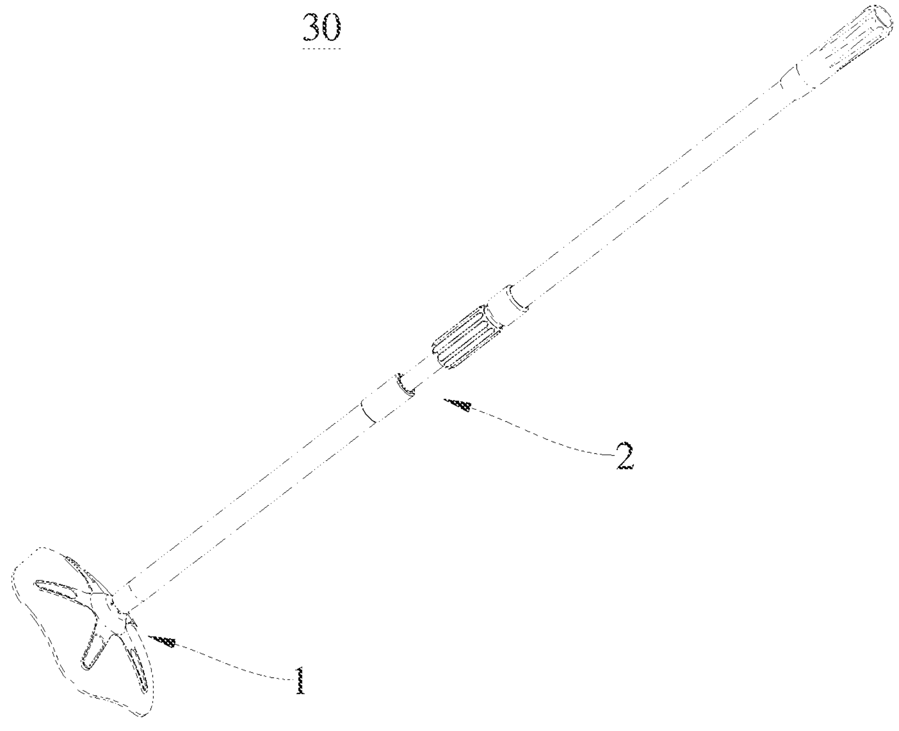
FIG. 1 illustrates a schematic structural overall view of a mopper according to an embodiment of the disclosure.

As illustrated in FIG. 1, a mopper 30 is provided according to an embodiment of the disclosure. The mopper 30 includes a cleaning pad 1 and a cleaning handle 2.

Figure 3:
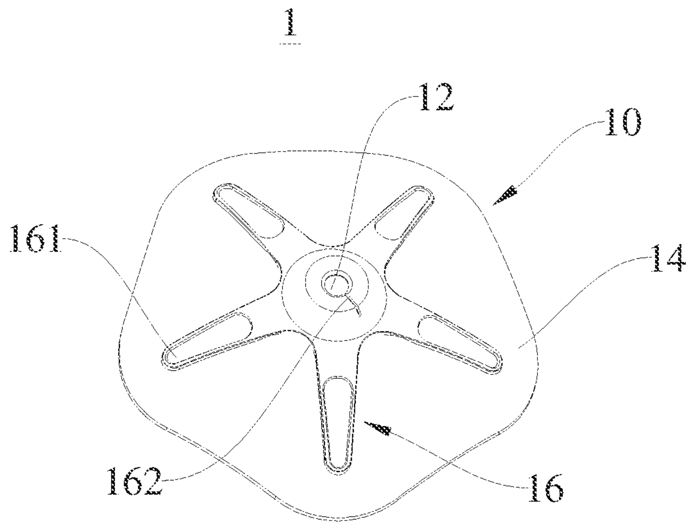
FIG. 3 illustrates a schematic structural view of a cleaning pad in FIG. 1 according to an embodiment of the disclosure.

Specifically, referring to FIG. 3, the cleaning pad 1 includes a pad body 10 and a first connector 12 disposed on the pad body 10. In a specific embodiment, the pad body 10 includes a cleaning portion 14, and a support member 16 attached to the cleaning portion 14 using adhesive, welding, fastening means such as threading connections or screws, or any other appropriate method. The first connector 12 is disposed in the support member 16. The cleaning portion 14 may be a dry fabric without disinfectant made of super absorbent and durable superfine fiber, or a wet fabric with disinfectant. When the cleaning portion 14 is the wet fabric with disinfectant, the user can clean a dirty surface perfectly without apply disinfectant to the cleaning pad 1 by hand, which leads the secure usage of the mopper 30. When the cleaning portion 14 is the dry fabric without disinfectant, the corresponding mopper 30 can clean a wet surface rapidly. In an embodiment, the cleaning pad 1 is one or more in number, and one of the one or more disposable pads includes a wet fabric with disinfectant or a dry fabric without disinfectant.

Further, in an embodiment of the disclosure, as illustrated in FIG. 3, the support member 16 includes five fingers 161 for fastening the cleaning portion 14. Of course, the number of the fingers 161 is not limited herein.

Figure 2:
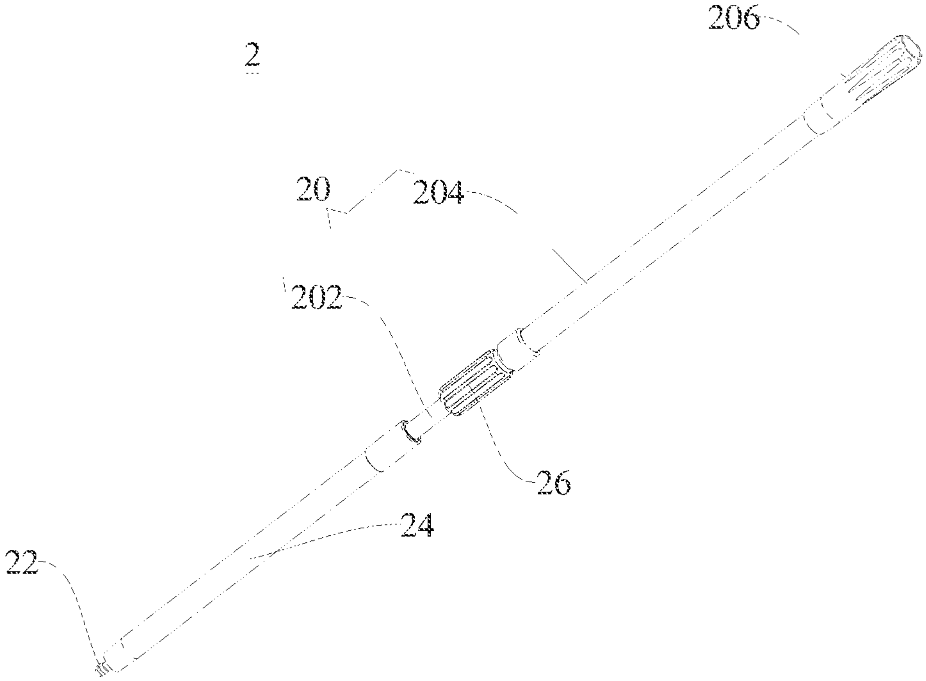
FIG. 2 illustrates a schematic structural view of a cleaning handle in FIG. 1 according to an embodiment of the disclosure.

Referring to FIG. 2, the cleaning handle 2 includes a handle body 20, a second connector 22, and a slider 24. The second connector 22 is connected to a first end of the handle body 20 using adhesive, welding, fastening means such as threading connections or screws, or any other appropriate method. The second connector 22 is configured to be fitted with the first connector 12 in a concave-convex manner. At least part of the second connector 22 is protruded from the slider 24. The slider 24 is movably sleeved outside the handle body 20, and the slider 24 is configured to, in a situation that the first connector 12 and the second connector 22 are fitted together in the concave-convex manner, move towards the first end of the handle body 20 along a lengthwise direction of the handle body 20 to drive the first connector 12 to be separated from the second connector 22. When the slider 24 moves towards the first end of the handle body 20, the second connector 22 moves to an internal cavity of the slider 24.

Figure 7:
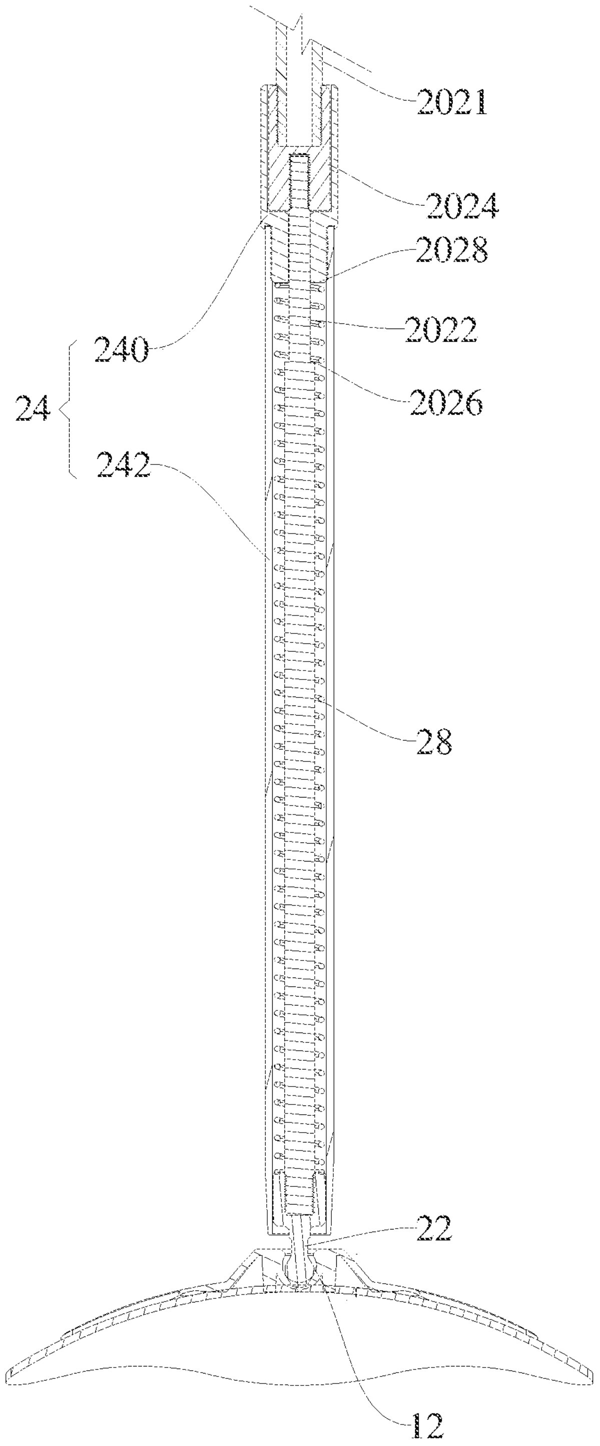
FIG. 7 illustrates a schematic enlarged cross-sectional view of a third portion of the mopper in FIG. 4.
Figure 8:
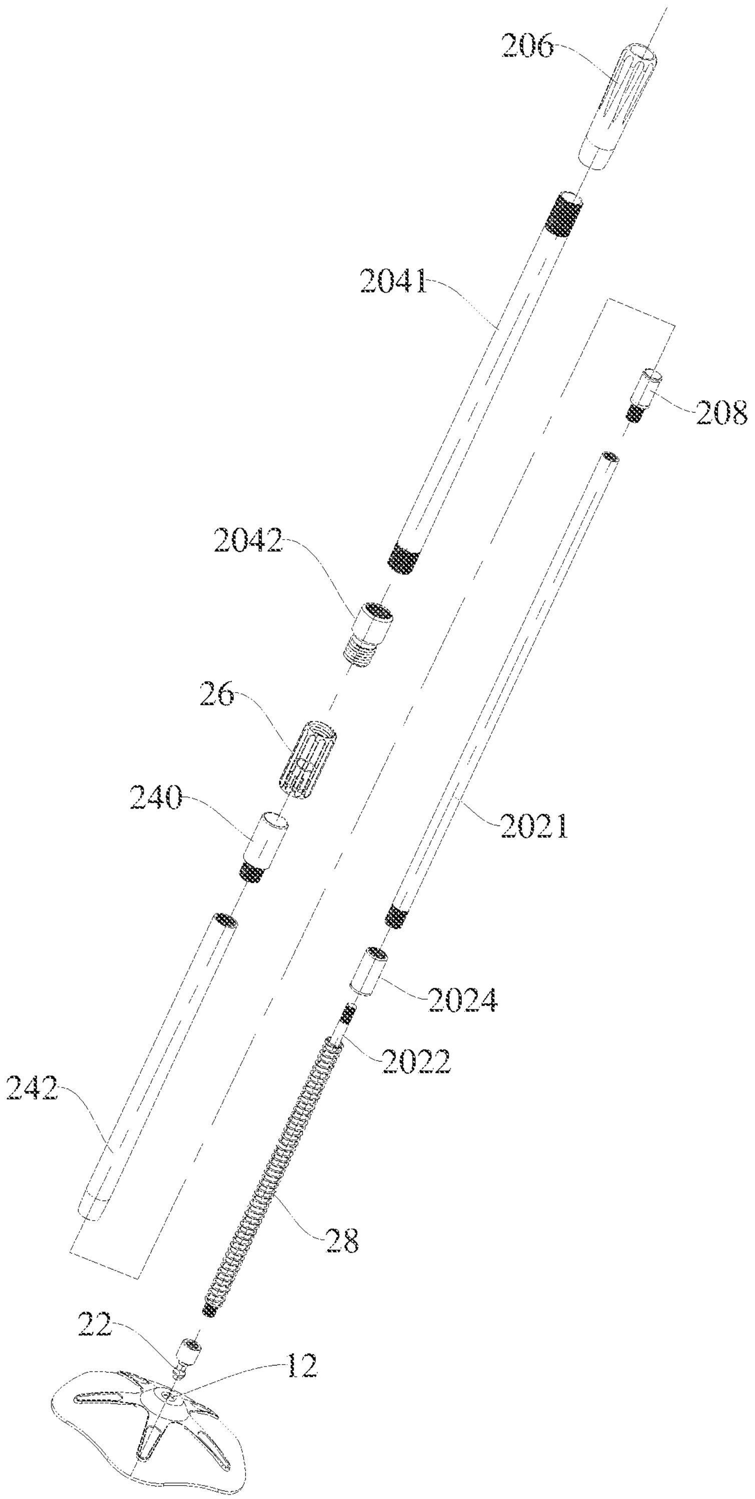
FIG. 8 illustrates a schematic exploded structural view of the mopper in FIG. 1 according to an embodiment of the disclosure.

In an embodiment of the disclosure, as illustrated in FIG. 2, FIG. 7 and FIG. 8, the cleaning handle 2 includes a resilient member 28, the resilient member 28 is disposed at the first end of the handle body 20 and in the slider 24. The resilient member 28 is configured for driving the slider 24 to move away from the second connector 22 along the lengthwise direction of the handle body 20 under an action of a restoration force of the resilient member 28, and thus to make the second connector 22 be exposed outside the slider 24. For example, the resilient member 28 is a coil spring, and the coil spring is sleeved on the handle body 20 at the first end.

Figure 4:
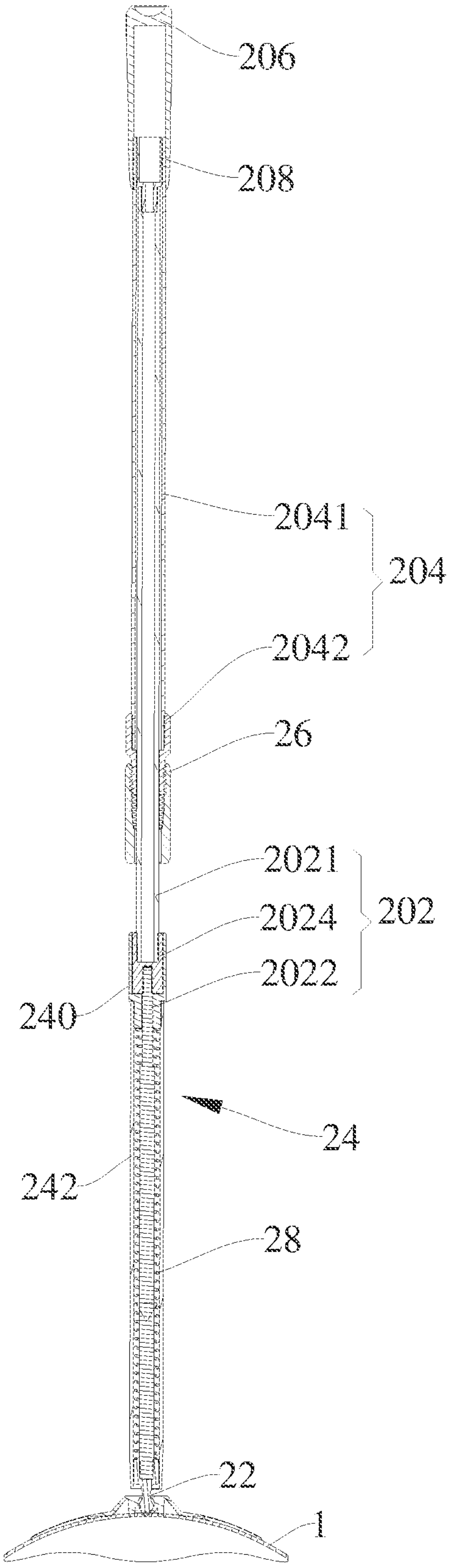
FIG. 4 illustrates a schematic structural cross-sectional view of the mopper in FIG. 1 according to an embodiment of the disclosure.
Figure 11:
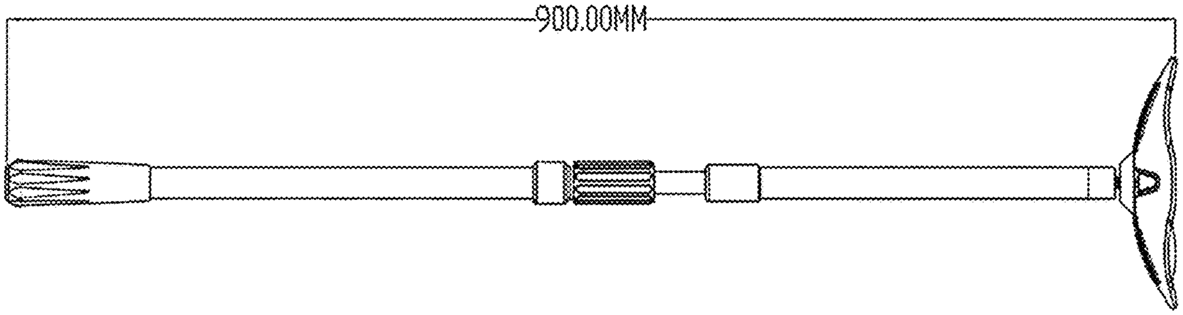
FIG. 11 illustrates a schematic structural view of the mopper in a contracted state according to an embodiment of the disclosure.
Figure 12:
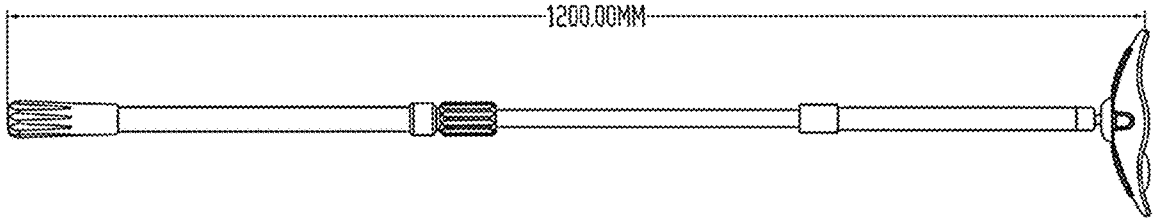
FIG. 12 illustrates a schematic structural view of the mopper in a stretched state according to an embodiment of the disclosure.

As illustrated in FIG. 2 and FIG. 4, in an embodiment of the disclosure, the handle body 20 includes an inner rod 202, an outer tube 204, and a clamp 26. A first end portion of the inner rod 202 is disposed in the outer tube 204, and a second end portion of the inner rod 202 opposite to the first end portion is disposed in the slider 24 and connected to the second connector 22. The clamp 26 is disposed at an end of the outer tube 204 facing towards the slider 24. The clamp 26 is configured to fix the inner rod 202 and the outer tube 204 in a locked state, and is configured to allow a relative movement between the inner rod 202 and the outer tube 204 in an unlocked state to thereby make the handle body 20 be variable in length. The mopper 30 is telescopic (owing to the handle body 20 is telescopic) and a length of the mopper 30 is variable in a range of 900 millimeters (mm) to 1200 mm by adjusting the relative movement between the inner rod 202 and the outer tube 204, as illustrated in FIGS. 11 and 12.

As illustrated in FIG. 2, FIG. 4 and FIG. 8, in an embodiment of the disclosure, the handle body 20 further includes a grip 206 disposed at second end of the handle body 20 opposite to the first end. An end of the outer tube 204 facing away from the clamp 26 is connected to the grip 206. With the grip 206, it is convenient for the user to grasp the mopper 30.

Figure 5:
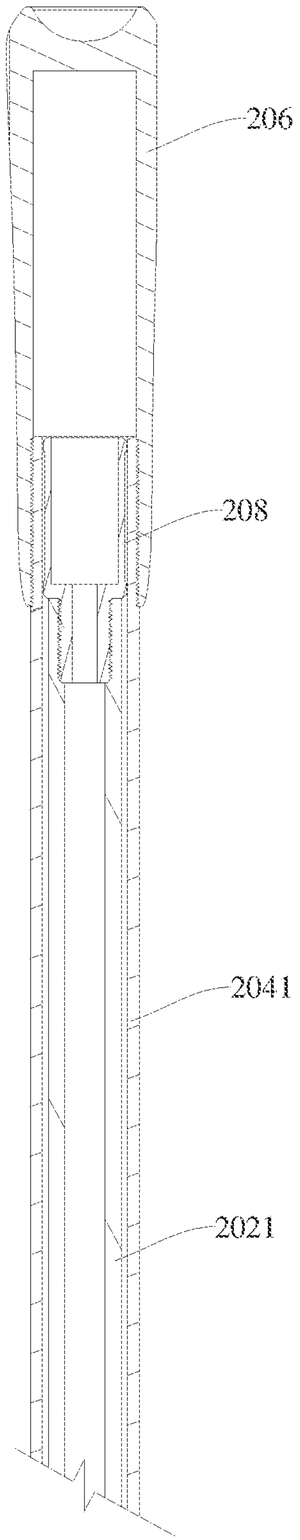
FIG. 5 illustrates a schematic enlarged cross-sectional view of a first portion of the mopper in FIG. 4.
Figure 6:
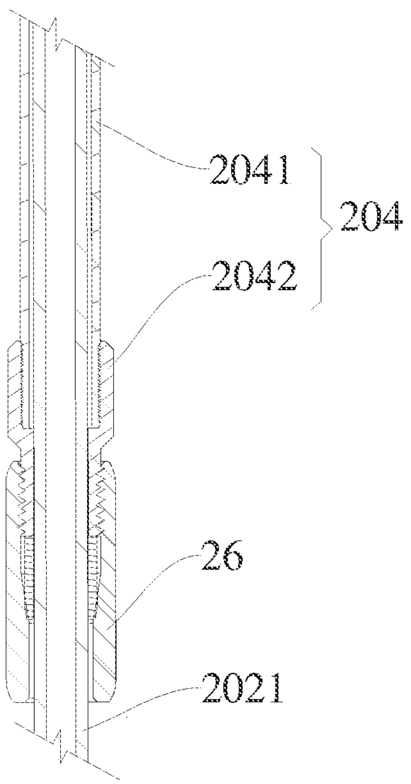
FIG. 6 illustrates a schematic enlarged cross-sectional view of a second portion of the mopper in FIG. 4.

As illustrated in FIG. 4, FIG. 5 and FIG. 8, in an embodiment of the disclosure, the handle body 20 may further include a stopper 208. The stopper 208 is connected to the first end portion of the inner rod 202 and is configured to prevent the inner rod 202 separating from the outer tube 204 when the inner rod 202 moves relative to the outer tube 204.

As illustrated in FIG. 4 through FIG. 8, in an embodiment of the disclosure, the inner rod 202 includes a first rod portion 2021, a second rod portion 2022, and a connecting portion 2024 connected between the first rod portion 2021 and the second rod portion 2022. The first rod portion 2021 is connected between the stopper 208 and the connecting portion 2024, and the second rod portion 2022 is connected between the second connector 22 and the connecting portion 2024.

As illustrated in FIG. 4 through FIG. 8, in an embodiment of the disclosure, the outer tube 204 includes a first tube portion 2041, and a second tube portion 2042 connected to the first tube 2041. The first tube portion 2041 is connected between the grip 206 and the second tube portion 2042, and the second tube portion 2042 is connected between the first tube portion 2042 and the clamp 26.

As illustrated in FIG. 4 through FIG. 8, in an embodiment of the disclosure, the slider 24 includes a slider body 242 and a slider cover 240 connected to the slider body 242, the slider cover 240 is provided with an inward radial lip 2028, the second rod portion is provided with an outward radial lip 2026, and the inward radial lip and the outward radial lip are cooperatively configured to limit a moveable distance of the slider 24.

In an embodiment of the disclosure, the first connector 12 is a ball socket, the second connector 22 is a ball joint, and a gap 162 is defined at a periphery of the ball socket, as illustrated in FIG. 3. Specifically, the support member 16 may be made of plastic, and the gap 162 is used to provide tolerance, when the first connector 12 and the second connector 22 are fitted. Of course, the first connector 12 may be a ball joint, and the second connector 22 is a ball socket, and specific structures of the first connector 12 and the second connector are not limited herein, as long as they can engage with each other rotatably and pivotably.

Figure 9:
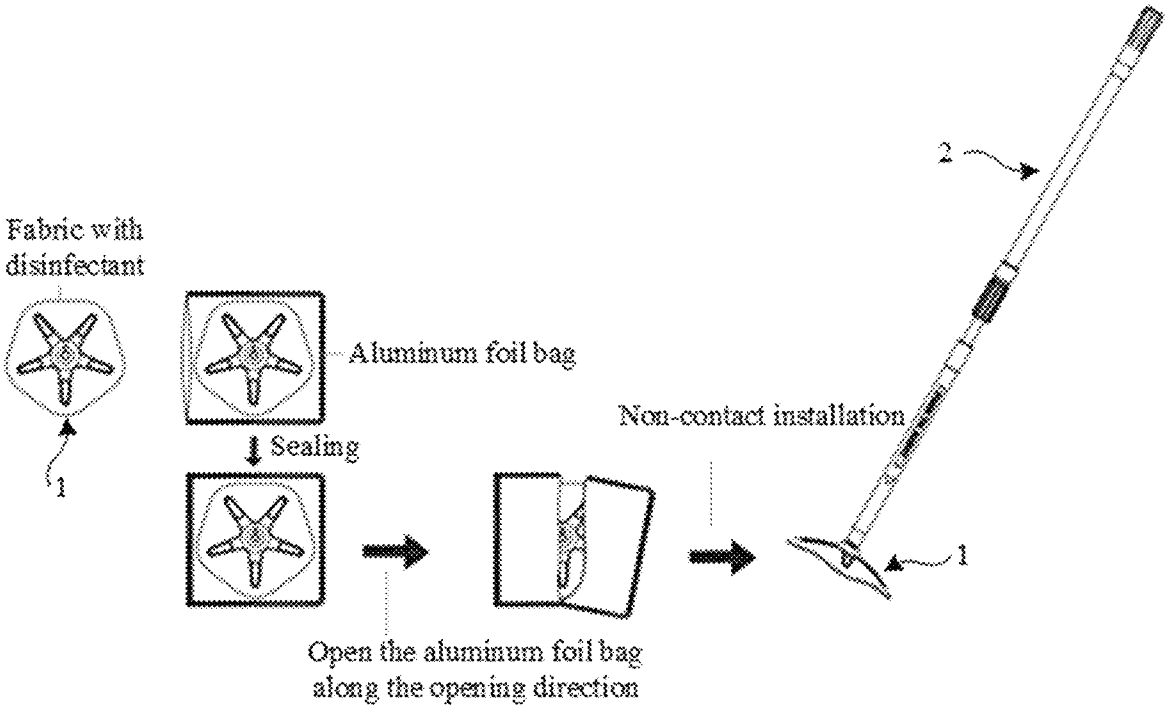
FIG. 9 illustrates a schematic view of a usage method of the mopper according to an embodiment of the disclosure.

In an embodiment of the disclosure, the cleaning pad 1 is disposable, and the cleaning pad 1 is packaged in an aluminum foil bag (as illustrated in FIG. 9) with a torn line at a center of the aluminum foil bag. As illustrated in FIG. 9, when using the mopper 30, the aluminum foil bag is opened along an opening direction (i.e., the torn line), and the cleaning pad 1 is taken out. Then, the cleaning handle 2 is connected to the cleaning pad 1 through connecting the first connector 12 and the second connector 22, which can achieve non-contact installation. Further, the cleaning portion 14 is roughly pentagonal, a length of the cleaning portion 14 is 164 mm and a width of the cleaning portion 14 is 160 mm. The cleaning handle 2 is made of Aluminum, therefore, the mopper 30 has excellent durability and portability to meet the needs of users.

Figure 10:
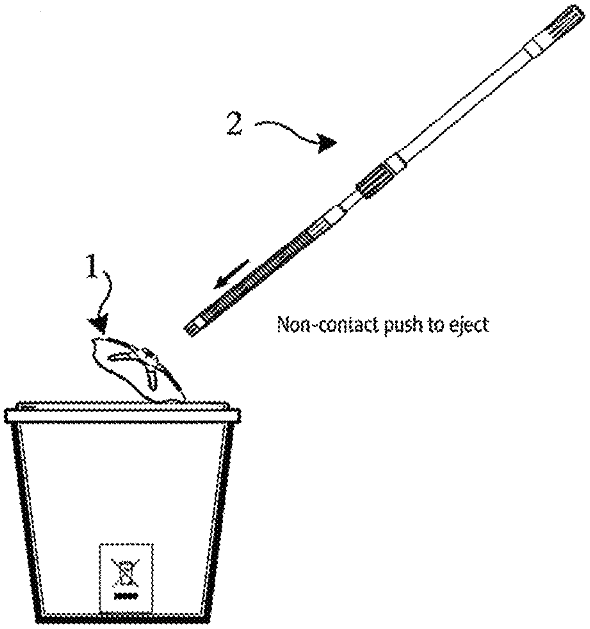
FIG. 10 illustrates a schematic view of pushing a cleaning handle of the mopper to remove a cleaning pad of the mopper to thereby eject the cleaning pad into a dustbin according to an embodiment of the disclosure.

With the mopper 30 above, in a cleaning process, when the cleaning pad 1 collects enough dirt or dust, the cleaning pad 1 can be easily pushed to eject from the cleaning handle 2 by manually pushing the slider 24 towards the second connector 22, and thus the cleaning pad 1 can be ejected into a dustbin without contacting of a user's hand with the cleaning pad 1, as illustrated in FIG. 10. This non-contact design ensures that the user does not need to directly contact dirt, thereby improving hygiene and cleanliness standards.

In addition, the mopper 30 is very cost-effective for an aviation industry. For a long time, the aviation industry has lacked an efficient and immediate cleaning scheme for a crew, so it can only rely on a cleaning team outside the crew. However, a turnaround period of many flights is often only 30-40 minutes, which often leads to flight delays when accidents occur and flights need to be cleaned. With the mopper 30, the crew can performing cleaning immediately and easily.

It should be noted that, components connected with each other described-above can be installed or attached using adhesive, welding, fastening means such as threaded connections or screws, or any other appropriate method, which is not limited herein.

It should be understood that, for those skilled in the art, there may be changes in specific implementations and application scope based on the ideas of the disclosure. In summary, the content of this specification should not be understood as a limitation of the disclosure.

What is claimed is:

1. A mopper, comprising:

a cleaning pad, comprising a pad body and a first connector disposed on the pad body; and a cleaning handle, comprising a handle body, a second connector, and a slider; wherein the second connector is connected to a first end of the handle body and configured to be fitted with the first connector in a concave-convex manner, the slider is movably sleeved outside the handle body, and the slider is configured to, in a situation that the first connector and the second connector are fitted together in the concave-convex manner, move towards the first end of the handle body along a lengthwise direction of the handle body to drive the first connector to be separated from the second connector;

wherein when the slider moves towards the first end of the handle body, the second connector moves into an internal cavity of the slider.

2. The mopper as claimed in claim 1, wherein the cleaning handle comprises a resilient member fixedly disposed at the first end of the handle body and in the slider, and the resilient member is configured for driving the slider to move away from the second connector along the lengthwise direction of the handle body under an action of a restoration force of the resilient member.

3. The mopper as claimed in claim 2, wherein the resilient member is a coil spring, and the coil spring is sleeved on the handle body at the first end.

4. The mopper as claimed in claim 1, wherein the handle body comprises an inner rod, an outer tube, and a clamp;

wherein a first end portion of the inner rod is disposed in the outer tube, a second end portion of the inner rod opposite to the first end portion is disposed in the slider and connected to the second connector, and the clamp is disposed at an end of the outer tube facing towards the slider; the clamp is configured to fix the inner rod and the outer tube in a locked state, and the clamp is configured to allow a relative movement between the inner rod and the outer tube in an unlocked state to thereby make the handle body be variable in length.

5. The mopper as claimed in claim 4, wherein the handle body comprises a stopper connected to the first end portion of the inner rod, and the stopper is configured to prevent the inner rod separating from the outer tube when the inner rod moves relative to the outer tube.

6. The mopper as claimed in claim 5, wherein the inner rod comprises a first rod portion, a second rod portion, and a connecting portion connected between the first rod portion and the second rod portion; and wherein the first rod portion is connected between the stopper and the connecting portion, and the second rod portion is connected between the second connector and the connecting portion.

7. The mopper as claimed in claim 6, wherein the slider comprises a slider body and a slider cover connected to the slider body, an end of the slider cover is provided with an inward radial lip and is inserted into an end of the slider body facing away from the second connector, the second rod portion is provided with an outward radial lip, and the inward radial lip and the outward radial lip are cooperatively configured to limit a movable distance of the slider.

8. The mopper as claimed in claim 1, wherein the mopper is telescopic and a length thereof is variable in a range of 900 millimeters (mm) to 1200 mm.

9. The mopper as claimed in claim 1, wherein the handle body comprises a grip disposed at a second end of the handle body opposite to the first end of the handle body.

10. The mopper as claimed in claim 1, wherein the pad body comprises:

a cleaning portion, and a support member attached to the cleaning portion, wherein the first connector is disposed in the support member.

11. The mopper as claimed in claim 10, wherein the cleaning portion is a fabric with disinfectant.

12. The mopper as claimed in claim 1, wherein the first connector is a ball socket, the second connector is a ball joint, and a gap is defined at a periphery of the ball socket; and wherein the support member is made of plastic; and the gap is used to provide tolerance, when the first connector and the second connector are fitted.

13. The mopper as claimed in claim 1, wherein the cleaning pad is a disposable pad, and the disposable pad is packaged in an aluminum foil bag with a torn line at a center of the aluminum foil bag.

14. A mopper, comprising:

one or more disposable pads, each of which comprising a pad body and a first connector disposed on the pad body; and a cleaning handle, comprising a handle body, a second connector, and a slider; wherein the second connector is connected to a first end of the handle body and configured to be engaged with the first connector, the slider is movably sleeved on the handle body, and the slider is configured to, after the first connector and the second connector are rotatably and pivotably engaged with each other, move towards the first end of the handle body along a lengthwise direction of the handle body to drive the first connector to be separated from the second connector;

wherein one of the one or more disposable pads comprises a wet fabric with disinfectant or a dry fabric without disinfectant;

wherein when the slider moves towards the first end of the handle body, the second connector moves into an internal cavity of the slider; and wherein the slider comprises a slider body and a slider cover connected to the slider body, an end of the slider cover is provided with an inward radial lip and is inserted into an end of the slider body facing away from the second connector.

15. The mopper as claimed in claim 14, wherein the handle body comprises an inner rod, an outer tube, and a clamp; the cleaning handle comprises a spring; a first end portion of the inner rod is disposed in the outer tube, a second end portion of the inner rod opposite to the first end portion is disposed in the slider and connected to the second connector, and the clamp is disposed at an end of the outer tube facing towards the slider; the clamp is configured to fix the inner rod and the outer tube in a locked state, and is configured to allow a relative movement between the inner rod and the outer tube in an unlocked state to thereby make the handle body be variable in length; the slider is sleeved on the inner rod, and the spring is sleeved on the inner rod and arranged between the slider and the inner rod; and the spring is configured to drive the slider to move away from the second connector along the lengthwise direction of the handle body under an action of a restoration force of the spring.

16. The mopper as claimed in claim 15, wherein the handle body comprises a stopper connected to the first end portion of the inner rod, and the stopper is configured to prevent the inner rod separating from the outer tube when the inner rod moves relative to the outer tube.

17. The mopper as claimed in claim 16, wherein the inner rod comprises a first rod portion, a second rod portion, and a connecting portion connected between the first rod portion and the second rod portion;

wherein the first rod portion is connected between the stopper and the connecting portion, and the second rod portion is connected between the second connector and the connecting portion; and wherein the spring is sleeved on the second rod portion and located between the second connector and the connecting portion.

18. The mopper as claimed in claim 17, wherein the second rod portion is provided with an outward radial lip on an end facing away from the second connector, and the inward radial lip and the outward radial lip are cooperatively configured to limit a movable distance of the slider.

19. A cleaning handle, comprising:

a telescopic handle body;

a connector, connected to an end of the telescopic handle body and configured to be detachably connected with a cleaning pad;

a slider, movably sleeved outside the end of the telescopic handle body, wherein the slider comprises a slider body and a slider cover connected to the slider body, an end of the slider cover is provided with an inward radial lip and is inserted into an end of the slider body facing away from the second connector, the second rod portion is provided with an outward radial lip, and the inward radial lip and the outward radial lip are cooperatively configured to limit a moveable distance of the slider; and a spring, deformably and fixedly sleeved on the end of the telescopic handle body and arranged in the slider;

wherein the slider is capable of moving towards the end of the telescopic handle body along a lengthwise direction of the telescopic handle body by manually pushing and is capable of moving back under an action of a restoration force of the spring.

20. The cleaning handle as claimed in claim 19, wherein the connector comprises a ball joint or a ball socket; and wherein the telescopic handle body comprises an inner rod, an outer tube and a clamp; a first end portion of the inner rod is disposed in the outer tube, a second end portion of the inner rod opposite to the first end portion is disposed in the slider and connected to the connector, and the clamp is disposed at an end of the outer tube facing towards the slider; the clamp is configured to fix the inner rod and the outer tube in a locked state and allow a relative movement between the inner rod and the outer tube in an unlocked state.

* * * * *